United States Patent [19]
Eilers

[11] 3,772,893
[45] Nov. 20, 1973

[54] SOIL SEALING METHOD
[75] Inventor: Louis H. Eilers, Inola, Okla.
[73] Assignee: The Dow Chemical Company, Midland, Mich.
[22] Filed: June 7, 1972
[21] Appl. No.: 260,598

[52] U.S. Cl................ 61/36 R, 61/1 R, 106/287 SS
[51] Int. Cl.............................................. E02d 19/16
[58] Field of Search................. 61/36 R, 1 R; 94/19, 94/22; 166/295; 106/287 SS; 260/DIG. 14

[56] References Cited
UNITED STATES PATENTS
3,016,713   1/1962   Deming................................. 61/1 R FOREIGN PATENTS OR APPLICATIONS
730,550   5/1955   Great Britain...................... 61/36 R Primary Examiner—Mervin Stein
Assistant Examiner—Alex Grosz
Attorney—William M. Yates et al.

[57] ABSTRACT

A mixture of soil, expanding lattice clay and a linear water soluble organic polymer solid is compacted in an area desired to be sealed to provide an effective seal against water penetration.

9 Claims, No Drawings

SOIL SEALING METHOD

BACKGROUND OF THE INVENTION

The present invention concerns technology for sealing soil, especially improving soil for agronomic practices and creating water barriers in soil masses.

The problem of controlling water migration into and through soil has been approached from many technical orientations. One line of technology involves dispersing chemicals into the water which carries them into contact with the soil surface where they are deposited to form a water-impermeable surface barrier. This approach is exemplified by the teachings of U.S. Pat. Nos. 3,124,934; 3,236,671 and 3,298,982.

Another approach has been to create cohered polymeric masses in situ within the soil. That is, the porous soil is impregnated with a copolymerizable monomer system containing monoethylenically and polyethylenically unsaturated monomers. Upon copolymerization, the soil is cohered to provide a highly water-impermeable barrier. This method is effective for many purposes but generally requires considerable monomer to accomplish the desired objectives. This line of technology is illustrated by U.S. Pat. Nos. 2,801,984; 2,865,177 and 3,056,757.

In still another method a surface to be sealed is contacted with an aqueous solution of expanding lattice clays and from 0.01 to about 0.1 per cent by weight based on the weight of the lattice clay of a polyelectrolyte (U.S. Pat. No. 3,016,713). In U.S. Pat. No. 3,520,140 it is taught to sandwich a relatively thin layer of discrete particles of a water swellable crosslinked organic polymer between soil masses.

SUMMARY OF THE INVENTION

In the practice of the present invention a dry mixture of expanding lattice clay and substantially linear water soluble organic polymer particles are intimately admixed with a layer of soil solids to be sealed. The layer is moistened with water and compacted to provide a seal against the penetration of water. Percent as employed herein means percent by weight unless otherwise stated.

Molecular weight as employed herein refers to the average molecular weight determined by intrinsic viscosity.

DETAILED DESCRIPTION OF THE INVENTION

Expanding lattice clays employed in the present invention are those in which the C-axis spacing when saturated with water reaches a maximum greater than 25 Angstrom units. Suitable clays include, for example, bentonite, monomorillonite, hectorite, saponite, nontronite, and other clay-type materials in which the particles are flat plate-like crystals.

Linear water soluble organic polymers useful in the invention are those having a molecular weight of at least about 150,000 preferably at least about 1 million, and are characterized in that they are substantially linear in configuration with very little crosslinking between the individual polymer chains. The polymers are preferably anionic, i.e. they must necessarily have substituents such as carboxy acids, carboxy acid salts, carboxy acid anhydrides, which in contact with water ionize to form polymeric ions with a substantial plurality of negatively charged sites. The preferred polymers have essentially continuous linear carbon backbones. This characteristic reduces the tendency of the polymers to degrade in the soil. However, if brines or other ion containing aqueous solutions are prevalent nonionic polymers are preferred. Cationic polymers tend to flocculate clays and thus tend to form discrete agglomerated groups instead of continuous impermeable layers.

Suitable classes of linear polymers include, for example, those taught in U.S. Pat. Nos. 2,625,529 and 2,652,379. Suitable polymers include, for example, polymeric water-soluble polyelectrolytes preferably having a molecular weight of at least 150,000 and containing a substantially linear carbon chain backbone derived by the polymerization of an aliphatic unsaturated group. Preferably the polymers have a molecular weight of at least 1 million.

By "polyelectrolyte" it is intended to include only polymeric organic substances which, when contacted with an aqueous medium, will form organic ions having a substantial number of ionizable groups distributed at a plurality of positions thereon.

One type of compound useful in the practice of the invention is the equimolar copolymer of a polycarboxylic acid derivative and at least one other monomer copolymerizable therewith. The polycarboxylic acid derivative may be maleic anhydride, maleic acid, iumaric acid, itaconic acid, citraconic acid, aconitic acid, the amides of these acids, the alkali metal, alkaline earth metal and ammonium salts of these acids, the partial alkyl esters, salts of the partial alkyl esters and the substituted amides of these polycarboxylic acids. The carboxylic acid, carboxylic acid salt, amide and substituted amide radicals are the ionizable groups which contribute to the hydrophilic properties and tend to make the polymers water-soluble. The hydrophilic properties may be entirely, or in part, due to the comonomer when acrylic acid, acrylamide, acrylic acid salts of alkali metals and ammonium, N-substituted acrylamide and the corresponding derivatives of methacrylic, crotonic or other polymerizable acids are used. Thus a copolymer of a dialkyl maleate and acrylic acid will be a water-soluble polyelectrolyte. When the hydrophilic maleic acid derivatives are used, hydrophobic comonomers may be used, for example, ethylene, propylene, isobutylene, styrene, $\alpha$-methylstyrene, vinyl acetate, vinyl chloride, vinyl formate, vinyl alkyl ethers, alkyl acrylates and alkyl methacrylates. In the practice of this invention the dibasic polybasic acid derivatives of the copolymers may be maleic acid, maleic anhydride, sodium maleate, potassium maleate, ammonium maleate, calcium maleate, monosodium maleate, monopotassium maleate, monoammonium maleate, monocalcium maleate, and a monoalkyl maleate, maleic acid amide, the partial amide of maleic acid, the N-alkyl substituted maleic acid amide, the N-amino ethyl maleamide, the N-aminoethyl maleimide, the alkylaminoalkyl maleamides, and the corresponding derivatives of itaconic, citraconic, fumaric and aconitic acids. Any of the said polybasic acid derivatives may be copolymerized with any of the other monomers described above, and any other which forms a copolymer with dibasic acid derivatives in equimolar proportions. The polybasic acid derivatives may be copolymers with a plurality of comonomers, in which case the total molar proportions of the comonomers will be equimolar with respect to the polybasic acid derivatives. Although these copolymers may be prepared by direct polymerization of the various monomers, frequently they are more easily prepared by an after reaction of other copolymers. For example, copolymers of maleic anhydride and another monomer may be converted to maleic acid copolymers by reaction with water and to metal salt copolymers by reaction with alkali metal compounds, alkaline earth metal compounds or ammonium compounds.

Certain of the hydrophilic derivatives of unsaturated polycarboxylic acids may be polymerizable in less than equimolar proportions with certain of the less hydrophobic comonomers, for example, vinyl formate and vinyl acetate, or with monomers with ionizable groups, such as acrylic acid, the alkali metal and ammonium salts of acrylic acid, acrylamides, and the various N-substituted acrylamides, methacrylic acid, the alkali metal and ammonium salts of methacrylic acid, methacrylamide and the various N-substituted methacrylamides, crotonic acids and the alkali metal and ammonium salts of crotonic acids, the crotonamides and the N-substituted crotonamides, vinyl sulfonic acid, and vinyl phosphonic acid. The hydrophilic derivatives of polycarboxylic acids include the half alkyl esters of maleic acid, and the partial alkyl esters of fumaric, itaconic, citraconic and aconitic acids. When less than 50 mole percent of these hydrophilic polybasic acid derivatives are used, and especially with the hydrophobic monomers, such as vinyl acetate and vinyl formate, the minimum proportion of polybasic acid derivative is that which will render the copolymer water-soluble.

Another modification of the copolymers of the various unsaturated polycarboxylic acid derivatives are those wherein more than 50 mole percent of the polycarboxylic acid derivative is copolymerized therein. This type of which fumaric acid and itaconic acid are examples of the hydrophilic monomer may involve a wide variation with respect to the non-hydrophilic monomer, ethylene, propylene, isobutylene, styrene, α-methylstyrene, vinyl acetate, vinyl formate, vinyl alkyl ethers, alkyl acrylates, and alkyl methacrylates being useful. If desired, the comonomer may be one which contributes to the hydrophilic property, for example vinyl alcohols, acrylic acid, methacrylic acid, acrylamide, methacrylamide and the various amides which have alkyl, aminoalkyl, or alkylaminoalkyl substituents on the nitrogen atom. The proportions of these various comonomers contemplate the use of more than 50 mole per cent of the polybasic acid derivative and less than 50 mole per cent of the comonomer. The comonomer may be used in relatively small proportions, depending upon the hydrophilic or hydrophobic nature of the comonomer; sufficient total hydrophilic groups in both monomers must be present to render the resultant copolymer soluble in water under the conditions of use. This type of copolymer may involve a plurality of the polycarboxylic acid derivatives and/or a plurality of the comonomers.

Other suitable water soluble polymers are the polymers of acrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted aminoalkyl esters of either acrylic or methacrylic acids. These polymeric compositions may be the homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example, by the hydrolysis of acrylonitrile or methacrylonitrile polymers.

Other useful water soluble organic polymers are the polymers which derive their hydrophilic characteristics from the presence of amine radicals. These include the polyvinylpyridines, the poly-N-vinyl amines, the poly-N-allylamines, the heterocyclic nitrogen compounds wherein the nitrogen is a tertiary amino group, and the amine and ammonium salts of said cyclic compounds. The vinyl amines may be present in copolymers with vinyl acetate, vinyl formate, vinyl chloride, acrylonitrile, styrene, esters of acrylic acid, esters of methacrylic acid, and other monomers capable of existing in copolymeric form with the N-vinyl amines. Included within the scope of this type of polymeric polyelectrolyte are the polymers of products derived by the hydrolysis of amides and imides, such as N-vinylformamide, N-vinylacetamide, N-vinylbenzamide, N-vinyl-N-methylformamide, N-vinyl-N-methylacetamide, N-vinyl-N-methylbenzamide, N-vinylphthalimide, N-vinylsuccimide, N-vinyldiformamide, and N-vinyldiacetamide. Similarly, copolymers of these various amides with other polymerizable monomers may be first prepared and subsequently hydrolyzed to the corresponding vinyl amine derivatives. The polyallylamines and polymethallylamines and copolymers thereof may be prepared by copolymerizing acrylonitrile or methacrylonitrile, alone or in the presence of other monomers, and then by hydrogenation converted into amine-containing polymers.

Another important class of water soluble organic polymers are the polymers of vinyl substituted amides, such as N-vinyl-N-methylformamide, N-vinylformamide, N-vinylacetamide, and other vinyl substituted amides, the polymers of which are water soluble. Useful compounds include homopolymers and copolymers with vinyl acetate, acrylonitrile, isobutylene, ethylene, styrene, vinyl chloride, vinylidene chloride, vinyl formate, vinyl alkyl ethers, alkyl acrylates, alkyl methacrylates, and copolymers with the more hydrophilic monomers, such as acrylic acid, methacrylic acid, acrylamide, methacrylamide, the various substituted amides, monoalkyl esters of maleic acid, the aminoalkyl esters of acrylic or other polymerizable acids, the alkali metal and ammonium salts of acrylic or other polymerizable acids, and other polymerizable compounds with ionizable functions.

Another class of water soluble organic polymers are the polymers of vinyl sulfonic acid, and the copolymers of vinyl sulfonic acid with one or more polymerizable organic monomers, for example, vinyl chloride, acrylonitrile, styrene, vinyl acetate and other polymerizable mono-olefinic compounds. Although the polymers and copolymers of vinyl sulfonic acid may be prepared by direct polymerization, they are more easily prepared by indirect methods. For example, polymers and copolymers of vinyl sulfonyl chloride may be first prepared and then hydrolyzed for conversion into vinyl sulfonic acid polymers, the vinyl sulfonic acid salt polymers, the vinyl sulfonic acid amides, and other vinyl sulfonic acid derivatives capable of ionization in aqueous solutions. Another useful indirect method of preparing this class of water soluble organic polymers involves the preparation of polymers of unsaturated hydrocarbons, for example, ethylene, propylene, isobutylene, styrene, α-methylstyrene and others, or the copolymers of the said unsaturated hydrocarbons and other polymerizable mono-olefinic compounds such as vinyl chloride, acrylonitrile, vinyl acetate, methyl methacrylates, alkyl acrylates and others, and thereafter introducing the sulfonic acid nuclei by a conventional sulfonation reaction. The sulfonic acid groups so introduced may be converted to sulfonic acid salts, acid amides or other electrolytic grouping. The copolymers of this type may involve the use of a plurality of sulfonic acid monomers and/or a plurality of the conventional comonomers as described.

As described above in connection with the various types of water soluble organic polymers suitable for the practice of this invention, the hydrophilic polymer may be prepared directly by the polymerization or copolymerization of one or more of the various available organic monomers with aliphatic unsaturation, if the said compounds contain a hydrophilic group, for example, carboxyl groups. Generally, more types of water soluble organic polymers can be prepared by subsequent reactions of polymers and copolymers. For example, polymers containing nitrile groups may be hydrolyzed to form water soluble amide and carboxy containing polymers or hydrogenated to form amine containing polymers. Similarly copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other water soluble polymers may be prepared by the ammonolysis of ketone containing polymers, for example, polyvinyl methyl ketone. Similarly active halogen atoms may be reacted with bisulfite to substitute sulfonic acid group for the reactive halogens. Other types of polymers prepared by the subsequent reaction of previously prepared polymers have been explained above in connection with the sulfonic and sulfonic acid salts of polymeric hydrocarbons and in connection with the vinyl amine polymers by hydrolysis of the N-vinyl amides.

In the specification and claims copolymers are identified in terms of their monomeric constituents. The names so applied refer to the molecular structure and are not limited to the polymers prepared by the copolymerization of the specified monomers. In many instances the identical copolymers may be prepared from other monomers and converted by subsequent chemical reaction to the desired copolymer.

Thus, the various water soluble organic polymers of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, phosphonic acid or derivatives thereof, heterocyclic nitrogen groups, aminoalkyl groups, alkoxy radicals and other organic groups, the number of which groups and the relative proportions of hydrophilic and hydrophobic groups being such as to provide a water soluble polymeric compound having a substantially large number of ionizable radicals. The length of the said continuous carbon chain must be such as to provide compounds having weight-average molecular weights of at least 150,000.

The expression "water soluble polymers" includes those which form homogeneous mixtures with water, the difficult soluble polymers which expand in the presence of water and dissolve to at least some extent, and even some which are apparently insoluble in distilled water but which tend to dissolve in soil water. This solubility enables the movement of the molecule within the soil mass through the medium of the soil moisture.

Other polymers include polyvinyl alcohols or other linear polymers containing a substantial number of alcoholic hydroxyl radicals appended thereto. The polymer may be a homopolymer or a copolymer of a vinyl ester with a substantial but usually a minor proportion of another monomer copolymerizable therewith, for example, acrylonitrile, acrylic acid, methacrylic acid, vinyl chloride, vinylidene chloride, vinyl ethers, maleic acid and the like.

Other polymers such as water soluble cellulose derivatives having structures similar to cellulose and containing hydrophilic groups such as carboxy, carboxy salt, carboxy alkyl, hydroxyl, and hydroxyl alkyl and the like may also be employed but may not generally be desired in the practice of the invention because of their tendency to degrade in the soil.

In practicing the invention a mixture of lattice clay, linear water soluble organic polymer and soil solids is provided in any convenient manner. From about 0.25 to about 20.0 percent, preferably about 2 to 10 percent of the mixture of the lattice clay and polymer should be admixed with the soil solids. The polymer should be provided in an amount ranging from 0.2 to about 10 percent by weight of the total weight of the lattice clay and polymer. Preferably the polymer is employed in an amount ranging from about 0.5 to about 3 (more preferably 0.5 to about 1.5) percent of the lattice clay. Amounts over about 3 percent are usually not economically justified.

The mixture of lattice clay, polymer and soil solids should be compacted preferably to at least about 80 percent of the maximum density of the particular soil as determined by the ASTM D698-70 set forth in 1972 Annual Book of ASTM Standards Part II, pp. 327-332. Sufficient water should be present in the soil to allow it to be compacted to at least 80 percent of the maximum density of the soil. The effective amount of water can also be determined by the ASTM standard D698-70.

Preferably the compacted layer should range from about 2 to about 10 inches in thickness. The exact thickness for effective sealing purposes will depend on the particular lattice clay, polymer and soil solids, on the height of the head of water, if any, on the degree of soil compaction, on the allowable (or acceptable) seepage rate and other similar circumstances. In each individual practice simple laboratory tests can be performed, such as those described in the following examples, to determine the most effective parameters. The maximum thickness of the layer is only restricted by the equipment employed to form the layer and other economic factors.

Admixture of the lattice clay and polymer solids with the soil solids can be achieved in any convenient manner. The layer may be formed by spreading a mixture of lattice clay and polymer solids on the soil and tilling them into place. Since the mixture of lattice clay and polymer particles are applied in the form of dry solids, the mixture can be easily dusted or blown onto a soil surface.

The size of the polymer particles is not critical to the practice of the invention since they dissolve in water. The clay particles should be similar in size to the polymer particles to prevent segregation. Clay particles ranging in size from about 100 to about 400 mesh can be employed. Preferred sizes are generally dictated by the size of soil solids to be admixed therewith. With increasing soil size, larger clay particles or crosslinked polymers should be used.

Other useful ingredients may be employed in the mixture to provide some desired function. For example, bactericides may be desired to protect certain polymers from degradation. Bactericides which can be employed include, for example, paraformaldehyde, hexachlorophenol, other phenols and certain quaternary amines.

Other useful ingredients include water swellable crosslinked polymers to aid in sealing porous soils such as sand and the like. Water swellable crosslinked polymers such as taught in U.S. Pat. No. 3,520,140, column 3, line 6 through column 4, line 8, can be employed. The teachings of this patent are specifically incorporated herein by reference. When employed, the water swellable polymer is employed in an amount up to about an equivalent amount by weight of the linear polymer.

The process may be used to seal water ponds, canals, lagoons, to prevent erosion of surface soils, to provide soil strength until vegetation can be grown and for other similar purposes.

The following examples will facilitate a more complete understanding of the present invention.

EXAMPLE 1

Sewage lagoons were to be sealed against loss of fluid. Soil from one of the lagoons was analyzed and found to be chiefly quartz (sand), feldspar, and a small amount of calcite with only 5 percent total clays and less than 1 percent montmorillonite. Various samples of the soil were admixed with one or more of montmorillonite clay (—200 mesh bentonite meeting API Standard 10A), a partially hydrolyzed linear polyacrylamide having a molecular weight of over 2 million and crosslinked polyacrylamide being about 2,500 ppm crosslinked and ranging in size from about 100 to 325 mesh. The treated soil was dampened with 12 percent by weight water, compacted in a one inch diameter glass tube to a height of 9 cm (3.5 in). A five foot head of tap water was then placed against the surface. Seepage rates of water through the sample were determined, in inches of head loss per day, and are set forth in the following Table I. The coefficient of permeability at 73°F ($K_t$) in microns per sec. ($10^{-6}$ m/sec) is also given. The coefficient of permeability can be calculated by dividing the seepage rate by the hydraulic gradient (fluid head divided by sample thickness) and by using appropriate unit conversion.

TABLE I

| Test No. | Soil composition, gms. per 100 gms. total | | | | Dry density, lbs. per cubic foot | Seepage, inches loss per day— | | | Coefficient of permeability after 7 days in microns per sec. |
|---|---|---|---|---|---|---|---|---|---|
| | Soil | Bentonite | Linear polymer | Cross-linked polymer | | 1 day | 2 days | 7 days | |
| 1 | 100 | 0 | 0 | 0 | 129 | 18.03 | 56.6 | 102.6 | 250 |
| 2 | 99.976 | 0 | 0.024 | 0 | 129 | 2.10 | 1.65 | 1.70 | 4.1 |
| 3 | 99.976 | 0 | 0 | 0.024 | 131 | 9.74 | 18.09 | 57.9 | 140 |
| 4 | 99.952 | 0 | 0.024 | 0.024 | 131 | 0.30 | 0.22 | 0.155 | 0.37 |
| 5 | 96 | 4 | 0 | 0 | 129 | 0.14 | 0.090 | 0.078 | 0.19 |
| 6 | 96 | 3.976 | 0.024 | 0 | 130 | 0.04 | 0.027 | 0.018 | 0.044 |
| 7 | 96 | 3.976 | 0 | 0.024 | 131 | 0.12 | 0.046 | 0.032 | 0.077 |
| 8 | 96 | 3.952 | 0.024 | 0.024 | 129 | 0.04 | 0.020 | 0.010 | 0.024 |

EXAMPLE 2

The sewage lagoons described in Example 1 were treated in the following manner. A mixture of 99.4 percent bentonite and 0.6 percent linear hydrolyzed polyacrylamide was spread on the surface of the soil at a rate of 1.2 lbs per square foot using an agricultural lime spreader attached to a truck. This mixture was admixed with the soil using disc-harrow and tilled to a depth of three inches. The soil mixture was then compacted to approximately 120 lbs per cubic foot using a vibratory steel drum compactor of the type used in road building. This produced 3 inches of compacted soil containing approximately 3.976 percent bentonite and 0.024 percent polymer by weight. The sewage lagoon was filled with water to a depth of 3 or 4 feet. At this level seepage was controlled to less than 0.1 inch per day.

EXAMPLE 3

It was desired to build a holding pond on a beach area where the soil consisted of very porous sand. Samples of sand from the desired lagoon area were analyzed and found to be almost completely quartz (sand) with a trace of carbonates as bits of sea shells. The mesh size was found to be 1 percent larger than 20 mesh, 27 percent of 20–40 mesh, 68 percent of 40–80 mesh, 3 percent of 80–100 mesh and 1 percent smaller than 100 mesh. This soil contained no clay size particles. Samples of the sand were admixed with one or more of bentonite, polyacrylamide, linear polymer and crosslinked polymer as described in Example 1. The treated soil was dampened with 10 percent by weight water and compacted in a one inch diameter glass tube to a height of 10.1 cm (4 inches). A 5 foot head of tap water was then placed against the surface. Seepage rates of water through the various samples are set forth in the following Table II.

usefulness as a soil sealant. The treatment materials consisted of:

A. Dry mixture of 99.28 percent bentonite clay particles, 0.6 percent linear polyacrylamide having a molecular weight greater than 2 million and 0.12 percent of paraformaldehyde as a bactericide.

B. Bentonite clay.

C. A dry mixture of about 27 percent of a water soluble linear polyacrylamide polymer, 27 percent of water swellable crosslinked acrylamide, 7 percent calcium chloride, 12 percent water and 27 percent silica flour.

D. A liquid dispersion in water of solids containing about 30 percent of a water soluble linear polyacrylamide, 30 percent water swellable crosslinked polyacrylamide, 30 percent sulfonic acid and the remainder various inhibitors, anti-foaming agents and pH control groups.

TABLE II

| Test No. | Soil compaction, gms. per 100 gms. | | | | Dry density, lbs. per cubic ft. | Seepage, inches loss per day— | | | Coefficient of permeability after 7 days in microns per sec. |
|---|---|---|---|---|---|---|---|---|---|
| | Beach sand | Bentonite | Linear polymer | Crosslinked polymer | | 1 day | 3 days | 7 days | |
| 1 | 100 | 0 | 0 | 0 | 117 | 14,620 | 14,835 | 14,190 | 39,000 |
| 2 | 99.95 | 0 | 0.05 | 0 | 119 | 13,760 | 13,330 | 13,115 | 36,000 |
| 3 | 99.95 | 0 | 0 | 0.05 | 119 | 2,699 | 1,548 | 2,067 | 5,700 |
| 4 | 99.90 | 0 | 0.05 | 0.05 | 120 | 219.5 | 146.9 | 106.2 | 290 |
| 5 | 96 | 4 | 0 | 0 | 119 | 84.96 | 120.4 | 118.0 | 325 |
| 6 | 96 | 3.95 | 0.05 | 0 | 121 | 0.04 | 0.022 | 0.013 | 0.036 |
| 7 | 96 | 3.95 | 0 | 0.05 | 119 | 0.88 | 0.035 | 0.013 | 0.036 |
| 8 | 96 | 3.90 | 0.05 | 0.05 | 120 | 0.05 | 0.023 | 0.013 | 0.036 |

EXAMPLE 4

It was desired to build ponds to hold water for industrial use. The soil was sandy and had a high seepage rate. Samples of the soil were mixed with bentonite and various organic polymers. The soil was then admixed with a total of 10 percent by weight water and compacted to approximately 95 percent of ultimate compaction to a 1 foot depth in a one inch glass tube. A 4.6 foot head of water (2 psi) was placed on the surface. Seepage rates of water through the various treated samples are given in Table III.

The bentonite composition B and a mixture of the present invention, Composition A, were dry blended with the soil solids to an indicated depth and 11 percent moisture (H$_2$O) was mixed therewith. The samples were then compacted. The sample treated with treating material D was compacted and then the surface was sprayed with the indicated material. The samples treated with treatment material C were compacted, covered with a head of water and the treatment material added to the water.

TABLE III

| Test No. | Soil Composition, gms. per 100 gms. total | | | Fluid loss, feet per year— | | Coefficient of permeability after 7 days (microns per sec.) |
|---|---|---|---|---|---|---|
| | Bentonite | Polymer | Polymer designation | 7 days | 60 days | |
| 1 | 0 | 0 | | >200 | >200 | >1.9 |
| 2 | 4 | 0 | | 0.330 | 0.252 | 0.031 |
| 3 | 0 | 0.08 | Linear polyacrylamide (MW>2M) | 13.4 | | 0.033 |
| 4 | 0 | 0.08 | Linear polyacrylamide (MW<2M) | 15.0 | | 0.37 |
| 5 | 3 | 0 | | 0.91 | 0.98 | 0.022 |
| 6 | 3 | 0.06 | Linear polyacrylamide (MW>2M) | 0.034 | 0.029 | 0.00084 |
| 7 | 3 | 0.06 | Linear polyacrylamide (MW<2M) | 0.084 | 0.038 | 0.0020 |
| 8 | 3 | 0.06 | Dow Separan AP273 (MW>2M) (acrylamide) | 0.039 | 0.024 | 0.00096 |
| 9 | 3 | 0.06 | Dow Purifloc A21 (MW>2M) (sulfonated polystyrene) | 0.042 | 0.031 | 0.00103 |
| 10 | 3 | 0.06 | Crosslinked acrylamide 2,500 p.p.m., crosslinked | 0.053 | 0.048 | 0.0013 |
| 11 | 3 | 0.06 | Maleic anhydride-methyl vinyl ether copolymer (MW<2M) | 0.096 | 0.098 | 0.0023 |
| 12 | 3 | 0.06 | Polyethylene oxide (MW>2M) | 0.105 | 0.092 | 0.0026 |
| 13 | 3 | 0.06 | Crosslinked acrylamide-vinyl pyrrolidone copolymer | 0.122 | 0.115 | 0.0030 |
| 14 | 3 | 0.06 | Polysaccaride (MW>2M) | 0.048 | 0.046 | 0.0012 |
| 15 | 3 | 0.10 | Guar gum | 0.205 | 0.317 | 0.0050 |

EXAMPLE 5

Samples of three different types of soils were treated with various treatment materials to determine their The compacted samples were placed under a 5 foot head of water.

The results of these tests are set forth in the following Table IV.

TABLE IV

| Soil | Dry density of soil (lb./ft.³) | Treatment Depth in. | Treatment Material | Seepage 1 day | Seepage 7 days | Comments | Coefficient of permeability (microns/sec.) 1 day | Coefficient of permeability (microns/sec.) 7 days |
|---|---|---|---|---|---|---|---|---|
| 1 | 116 | 3.5 | None | 10 | | | 24 | |
| 1 | 117 | 3 | 4% A | 0.06 | 0.02 | Dry blended | | 0.042 |
| 1 | 117 | 3 | 4% B | 0.8 | | do | 1.7 | |
| 1 | 117 | 3.5 | C | 2 | | Surface treatment | 4.8 | |
| 1 | 116 | 3.5 | D | 4 | | do | 9.7 | |
| 2 | 113 | 3.5 | None | 88 | | | 2.4 | |
| 2 | 114 | 3 | 4% A | 0.04 | 0.02 | Dry blended | | 0.042 |
| 2 | 106 | 3 | 4% B | 0.9 | | do | 1.9 | |
| 2 | 115 | 3.5 | C | 0.4 | | Surface treatment | 0.93 | |
| 2 | 113 | 3.5 | D | 28 | | do | 68 | |
| B | 114 | 3.5 | None | 12 | | | 29 | |
| B | 114 | 3 | 4% A | 0.10 | 0.06 | Dry blended | | 0.12 |
| B | 120 | 3 | 4% B | 0.6 | | do | 1.2 | |
| B | 117 | 3.5 | C | 1.2 | | Surface treatment | 2.9 | |
| B | 114 | 3.5 | D | 1.4 | | do | 3.3 | |

All these examples evidence the fact that far superior results were achieved when soils were treated according to the principles of the present invention. In all instances when soil samples were mixed with a dry blend of a lattice clay and a linear water soluble polymer, and in some examples also with a water swellable cross-linked polymer and compacted to at least 80 percent of ultimate compaction more permeable barriers were formed.

What is claimed is:

1. A method for reducing the permeability of soil solids to water which comprises:
   a. admixing to a layer of said soil solids a mixture of an expanding lattice clay and a linear water soluble organic polymer, said polymer having a molecular weight of at least about 150,000 and containing a substantially continuous linear carbon backbone, said mixture comprising from about 0.25 to about 20 per cent of said layer of said soil solids, and further wherein said polymer comprises from about 0.2 to about 10 per cent by weight of said lattice clay, and
   b. compacting said layer of soil containing said mixture to at least about 80 per cent of its maximum density.

2. The method of claim 1 wherein the organic polymer has a molecular weight of at least about 1 million.

3. The method as defined in claim 1 wherein, in addition, a water-swellable organic polymer is admixed with said layer of soil in an amount up to about the amount of said water soluble linear polymer.

4. The method as defined in claim 1 wherein the organic polymer is anionic.

5. The method as defined in claim 1 wherein the organic polymer is nonionic.

6. The method of claim 1 wherein said organic polymer is present in an amount ranging from about 0.5 to about 3 percent of said lattice clay.

7. The method of claim 1 wherein said organic polymer is present in an amount ranging from about 0.5 to about 3 percent of said lattice clay and said lattice clay and organic polymer comprise from about 2 to about 10 percent of said soil solids.

8. The method of claim 7 wherein there is admixed with said soil solids a water-swellable organic polymer in an amount up to about the amount of said water soluble organic polymer.

9. The method of claim 8 wherein said water soluble organic polymer has a molecular weight of at least about 1 million.

* * * * *